(12) United States Patent
Yu et al.

(10) Patent No.: US 12,175,767 B2
(45) Date of Patent: Dec. 24, 2024

(54) END-TO-END OBJECT TRACKING USING NEURAL NETWORKS WITH ATTENTION

(71) Applicant: Waymo LLC, Mountain View, CA (US)

(72) Inventors: Ruichi Yu, Mountain View, CA (US); Xu Chen, Livermore, CA (US); Shiwei Sheng, Cupertino, CA (US); Luming Tang, Ithica, NY (US); Chieh-En Tsai, Burlingame, CA (US)

(73) Assignee: Waymo LLC, Mountain View, CA (US)

( * ) Notice: Subject to any disclaimer, the term of this patent is extended or adjusted under 35 U.S.C. 154(b) by 226 days.

(21) Appl. No.: 17/715,838

(22) Filed: Apr. 7, 2022

(65) Prior Publication Data

US 2023/0326215 A1    Oct. 12, 2023

(51) Int. Cl.
| | |
|---|---|
| G06V 20/58 | (2022.01) |
| B60W 60/00 | (2020.01) |
| G06T 7/20 | (2017.01) |
| G06V 10/62 | (2022.01) |
| G06V 10/82 | (2022.01) |

(52) U.S. Cl.
CPC ............... *G06V 20/58* (2022.01); *G06T 7/20* (2013.01); *G06V 10/62* (2022.01); *G06V 10/82* (2022.01); *B60W 60/001* (2020.02); *B60W 2420/403* (2013.01); *G06T 2207/10028* (2013.01); *G06T 2207/20084* (2013.01)

(58) Field of Classification Search
CPC ........ G06V 20/58; G06V 10/62; G06V 10/82; G06T 7/20; G06T 2207/10028; G06T 2207/20084; B60W 60/001; B60W 2420/403
See application file for complete search history.

(56) References Cited

U.S. PATENT DOCUMENTS

| | | | |
|---|---|---|---|
| 9,760,806 B1* | 9/2017 | Ning | G06V 20/56 |
| 10,984,512 B2* | 4/2021 | Jang | G06T 5/50 |
| 2018/0012107 A1* | 1/2018 | Xu | G06F 18/2414 |
| 2019/0147610 A1* | 5/2019 | Frossard | G06T 7/70 |
| | | | 382/103 |

(Continued)

OTHER PUBLICATIONS

Braso et al: Learning a Neural Solver for Multiple Object Tracking, 11 pages (Year: 2020).*

(Continued)

*Primary Examiner* — Dale W Hilgendorf
(74) *Attorney, Agent, or Firm* — Lowenstein Sandler LLP

(57) ABSTRACT

The described aspects and implementations enable efficient calibration of a sensing system of a vehicle. In one implementation, disclosed is a method and a system to perform the method, the system including the sensing system configured to obtain a plurality of images associated with a corresponding time of a plurality of times. The system further includes a data processing system operatively coupled to the sensing system and configured to generate a plurality of sets of feature tensors (FTs) associated with one or more objects of the environment depicted in a respective image. The data processing system is further to obtain a combined FT and process the combined FT using a neural network to identify one or more tracks characterizing motion of a respective object.

20 Claims, 7 Drawing Sheets

(56) References Cited

U.S. PATENT DOCUMENTS

| | | | | |
|---|---|---|---|---|
| 2019/0258907 A1* | 8/2019 | Rezende | ............... | G06T 7/70 |
| 2020/0013154 A1* | 1/2020 | Jang | ............... | G06T 3/4038 |
| 2021/0158161 A1* | 5/2021 | Louizos | ............... | G06N 3/04 |
| 2021/0287067 A1* | 9/2021 | Zavoronkovs | ............... | G06N 3/044 |
| 2022/0076432 A1* | 3/2022 | Ramezani | ............... | G06T 7/73 |
| 2022/0130109 A1* | 4/2022 | Arbabian | ............... | G06T 17/05 |
| 2022/0398775 A1* | 12/2022 | Streem | ............... | G06T 17/05 |
| 2023/0038842 A1* | 2/2023 | Yu | ............... | G06N 20/20 |
| 2024/0212206 A1* | 6/2024 | Hilsenbeck | ............... | G06V 20/58 |

OTHER PUBLICATIONS

Rangesh et al: TrackMPNN, 12 pages (Year: 2021).*
Carion et al., "End-to-End Object Detection with Transformers", Facebook AI, arXiv:2005.12872v3 [cs.CV], May 28, 2020, 26 pages.
Wang et al., "Anchor DETR: Query Design for Transformer-Based Object Detection", MEGVII Technology, Association for the Advancement of Artificial Intelligence, enarXiv:2109.07107v2 [cs.CV], 8 pages.
Vaswani et al., "Attention Is All You Need", 31st Conference on NIPS, arXiv:1706.03762v5 [cs.CL], Dec. 6, 2017, 15 pages.
Extended European Search Report for European Application No. EP231655291, mailed Jun. 14, 2023, 8 Pages.
Hung, et al., "SoDA: Multi-Object Tracking with Soft Data Association, "ARXIV.ORG, 2020, pp. 1-13.
Ren, et al., "Faster R-CNN: Towards Real-time Object Detection With Region Proposal Networks," Advances in Neural Information Processing Systems 28, 2015, pp. 1-9.

* cited by examiner

END-TO-END OBJECT TRACKING USING NEURAL NETWORKS WITH ATTENTION

TECHNICAL FIELD

The instant specification generally relates to systems and applications that identify and track moving objects and, in particular, to autonomous vehicles and vehicles deploying driver assistance technology. More specifically, the instant specification relates to using machine learning with attention to improve efficiency and reliability of object tracking, including but not limited to vehicles, pedestrians, bicyclists, animals, and numerous other objects.

BACKGROUND

An autonomous (fully or partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the driving environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
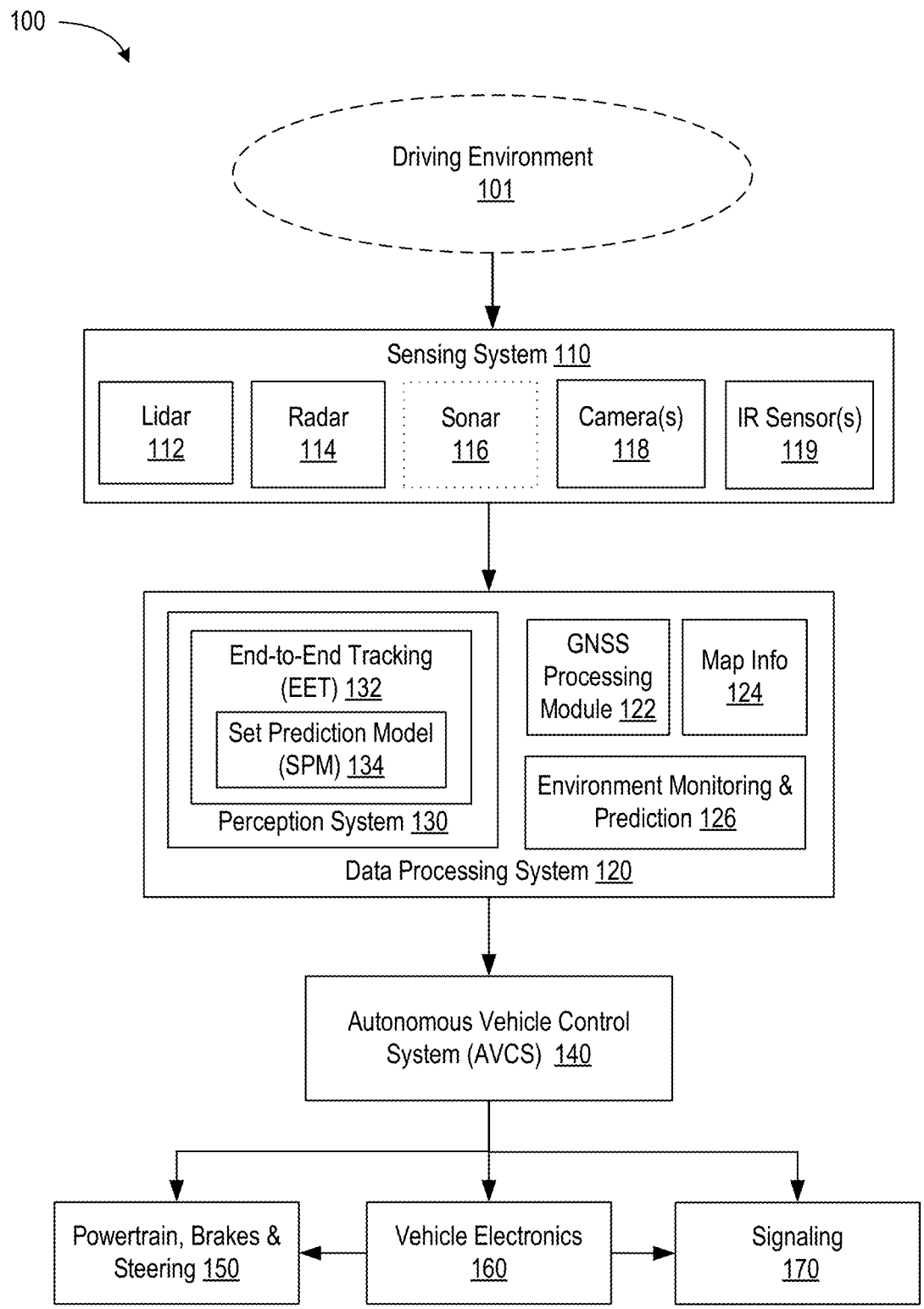
FIG. 1 is a diagram illustrating components of an example autonomous vehicle (AV) capable of fast and accurate end-to-end detection, identification, and tracking of objects in outside environments, in accordance with some implementations of the present disclosure.

In one implementation, disclosed is a method that includes obtaining, by one or more sensors, a plurality of images of an environment, wherein each image of the plurality of images is associated with a corresponding time of a plurality of times. The method further includes generating, by one or more processing devices, a plurality of sets of feature tensors (FTs), each set associated with one or more objects of the environment depicted in a respective image of the plurality of images. The method further includes obtaining, using the plurality of sets of FTs, a combined FT and processing the combined FT using a neural network to identify one or more tracks, wherein each track of the one or more tracks characterizes motion of a respective object of the one or more objects of the environment.

In another implementation, disclosed is a system that includes a sensing system and a data processing system. The sensing system is configured to obtain a plurality of images of an environment, wherein each image of the plurality of images is associated with a corresponding time of a plurality of times. The data processing system is operatively coupled to the sensing system and configured to generate a plurality of sets of FTs, each set of FTs associated with one or more objects of the environment depicted in a respective image of the plurality of images. The data processing system is further configured to obtain, using the plurality of sets of FTs, a combined FT and process the combined FT using a neural network to identify one or more tracks, wherein each track of the one or more tracks characterizes motion of a respective object of the one or more objects of the environment.

In another implementation, disclosed is a system that includes a sensing system of an autonomous vehicle (AV) and a perception system of the AV. The sensing system is configured to obtain a plurality of images of an environment, each image of the plurality of images being associated with a corresponding time of a plurality of times. The perception system includes a detector machine-learning model (MLM) configured to process graphical representations of the plurality of images. The perception system further includes a prediction MLM configured to generate a plurality of sets of FTs, wherein each set of FTs is associated with one or more objects of the environment depicted in a respective image of the plurality of images, obtain, using the plurality of sets of FTs, a combined FT, and process the combined FT using a neural network to identify one or more tracks, wherein each track of the one or more tracks characterizes motion of a respective object of the one or more objects of the environment. The perception system is further configured to cause a driving path of the AV to be modified in view of the identified one or more tracks.

DETAILED DESCRIPTION

Although various implementations may be described below, for the sake of illustration, using autonomous driving systems and driver assistance systems as examples, it should be understood that the techniques and systems described herein can be used for tracking of objects in a wide range of applications, including aeronautics, marine applications, traffic control, animal control, industrial and academic research, public and personal safety, or in any other application where automated detection of objects is advantageous.

In one example, for the safety of autonomous driving operations, it can be desirable to develop and deploy techniques of fast and accurate detection, classification, and tracking of various road users and other objects encountered on or near roadways, such as road obstacles, construction equipment, roadside structures, and the like. An autonomous vehicle (as well as various driver assistance systems) can take advantage of a number of sensors to facilitate detection of objects in a driving environment and determine the motion of such objects. The sensors typically include radio detection and ranging sensors (radars), light detection and ranging sensors (lidars), digital cameras of multiple types, sonars, positional sensors, and the like. Different types of sensors provide different and often complementary benefits. For example, radars and lidars emit electromagnetic signals (radio signals or optical signals) that reflect from the objects and carry information allowing to determine distances to the objects (e.g., from the time of flight of the signals) and velocities of the objects (e.g., from the Doppler shift of the frequencies of the signals). Radars and lidars can cover an entire 360-degree view, e.g., by using a scanning transmitter of sensing beams. Sensing beams can cause numerous reflections covering the driving environment in a dense grid of return points. Each return point can be associated with the distance to the corresponding reflecting object and a radial velocity (a component of the velocity along the line of sight) of the reflecting object.

Existing systems and methods of object identification and tracking use various sensing modalities, e.g., lidars, radars, cameras, etc., to obtain images of the environment. The images can then be processed by trained machine learning models to identify locations of various objects in the images (e.g., in the form of bounding boxes), state of motion of the objects (e.g., speed, as detected by lidar or radar Doppler effect-based sensors), type of the object (e.g., a vehicle or pedestrian), and so on. Motion (or any other evolution, such as splitting of a single object into multiple objects) of the detected objects can be performed by creating and maintaining tracks associated with a particular object. For example, when a vehicle appears within a region observable by the sensors, a tracking system can create a track that specifies position and orientation ("pose") of the vehicle at various sensing times, as well as any additional information about the vehicle, e.g., a lane of the vehicle's travel, a status of the street lights that cause the vehicle to move or stop, and so on. After a passenger exits the vehicle and begins walking, the tracking system can create a new track and can similarly characterize the evolution of the pedestrian's pose and status (e.g., pedestrian crossing the roadway). After the passenger has entered an underground railway station (or has become occluded by oncoming traffic), the tracking system can delete the track (or label the track temporarily inactive) and so on.

Traditional tracking is a multi-stage operation that has a high computational overhead. For example, during a first stage of tracking, newly obtained data may be associated with one or more of the existing tracks. During a second stage, the new data may be used to update the state of the track, e.g., to compute a new pose, speed, acceleration, etc., of the vehicle, During a third state, the tracking system may perform management of the existing tracks, e.g., delete some of the existing tracks, mark other tracks as inactive, or establish one or more new tracks, if some of the received data cannot be associated with any existing tracks, e.g., if one or more new objects have entered the environment.

Furthermore, data association often requires handling different sensing modalities using separate models, establishing separate associations of lidar data, camera data, radar data, etc., with the existing or new tracks, and so on. Moreover, in addition to being computation-costly, traditional object tracking and track management can be sensitive to detection or association errors. For example, a new data wrongly associated with an incorrect track can result in an error that accumulates with time (additional sensing frames), persists for some time, and requires additional computational overhead to correct. This makes the existing tracking platforms difficult to deploy on vehicles, traffic control devices, surveillance systems, endpoint devices, and various other systems that lack powerful computational hardware.

Aspects and implementations of the present disclosure address these and other shortcomings of the existing detection technology by enabling methods and systems that facilitate fast and reliable identification, classification, and tracking of objects in a variety of environments, including driving environments. In particular, disclosed techniques implement sequence-to-sequence tracking methods, in which logical connections are identified not as a result of incremental entity-by-entity (e.g., object-by-object) analysis, but by processing an entire sequence of objects as a whole. The disclosed techniques can use a state-of-the-art transformer technology that, unlike existing models, does not rely on performance of various surrogate tasks (such as inter-frame object matching) and further avoids introducing various model parameters that cannot be easily determined during training and instead have to be tuned heuristically as part of a complex decision-making process.

Described implementations depart from the conventional association-update-management paradigm and use sequence-to-sequence techniques to achieve performance that is superior to the traditional heuristic-based tracking models. The disclosed techniques approach object tracking as a set prediction problem, in which classifications of objects and logical connections between various objects are obtained at once for an entire set of objects depicted in multiple frames. More specifically, according to some implementations of the present disclosure, instead of sequential sensing frame (image) processing, tracking is performed concurrently for multiple, e.g., N=2, 4, 10, etc., sensing frames collected over a period of time. For example, frames 1, 2 . . . . N can be capturing (depicting) objects A, B, and C (or any other number of objects) at different poses and relative to changed environments at some frame-taking times $t_1, t_2 \ldots t_N$. Various frames can be processed (in parallel or sequentially, in a pipeline fashion) by a detection model. The detection model identifies presence of objects A, B, and C in the individual frames, e.g., by identifying a bounding box information, such as the center of the bounding box (X, Y) and its size (W, H) (in an illustrative example of a two-dimensional image). The detection can, optionally, include any suitable semantic information S, such as a type of the object (e.g., vehicle, pedestrian, bicyclist, etc.) or some other suitable embedding representative of the content of the bounding box. In some implementations, the semantic information is not yet a final classification of the object, but some intermediate distribution of probabilities of a particular object belonging to multiple classes. Feature vectors or, more generally, feature tensors representative of each object, e.g., object A $(X_{Ai}, Y_{Ai}, W_{Ai}, H_{Ai}, S_{Ai}, t_i)$ at each of the times $t_i=t_1, t_2 \ldots t_N$, can then be joined (e.g., concatenated or otherwise appended) into a combined feature vector or feature tensor that is subsequently processed by a neural network (NN) deploying one or more attention blocks. Although, for conciseness, the reference throughout this disclosure is made to feature tensors, it should be understood that the term "feature tensor" encompasses feature vectors, feature matrices, and any applicable representation of digitized features representative of objects. In some implementations, the combined feature tensor can have a dimension M×K, where M is the total number of objects in the last N frames and K is the dimension in the feature space. In some implementations, M can be a fixed number, which is substantially bigger than the number of typical objects captured by K frames. When fewer than M objects are detected, the remaining feature tensors can have null values. The attention block(s) are trained to identify correlations between depictions of similar objects in different images, in view of the contextual information represented by the feature tensors of other objects. The identified correlations are then used to generate learned track queries that, upon further processing by the NN, identify tracks $T_A$, $T_B$, etc., as set of linked object data, e.g., $$T_A=[(X_{A1},Y_{A1},W_{A1},H_{A1},t_1),(X_{A2},Y_{A2},W_{A2},H_{A2},t_2)...(X_{AN},Y_{AN},W_{AN},H_{AN},E_N)],$$

and similarly for other tracks. Correspondingly, correct associations of object detections at different times (e.g., object A detections at times $t_i=t_1, t_2 \ldots t_N$, object B detections at times $t_i=t_1, t_2 \ldots t_N$, and so on) are obtained using joint (and concurrent) processing that provides a solution of a set prediction problem, rather than as the traditional frame-by-frame processing and association. The NN can have a number of additional classification heads that output various semantic and contextual information about the objects, including but not limited to a type of the object (e.g., a passenger car, a bus, a truck, a pedestrian, construction equipment, road blockage, etc.), a pose of the object (location, orientation, direction of motion) the speed of the object, the type of motion of the object (e.g., accelerating object, decelerating object, cruising object, etc.), as well as associations between objects (e.g., a passenger exiting a particular vehicle, etc.).

Advantages of the described implementations include but are not limited to fast and accurate identification and tracking of objects in a way that avoids large computational overheads of traditional frame-by-frame data-track association with the subsequent track update-management processing. Track management in the described implementations can be performed by matching tracks identified independently for separate batches of input frames. Additionally, such an end-to-end processing enables unified treatment on equal footing of different sensing modalities, e.g., radar data, camera data, radar data, infrared camera data, and so on.

FIG. 1 is a diagram illustrating components of an example autonomous vehicle (AV) 100 capable of fast and accurate end-to-end detection, identification, and tracking of objects in outside environments, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), spacecraft (controllable objects operating outside Earth atmosphere) or any other self-propelled vehicles (e.g., robots, factory or warehouse robotic vehicles, sidewalk delivery robotic vehicles, etc.) capable of being operated in a self-driving mode (without a human input or with a reduced human input).

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, piers, banks, landing strips, animals, birds, and so on. The driving environment 101 can be urban, suburban, rural, and so on. In some implementations, the driving environment 101 can be an off-road environment (e.g. farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, falling leaves, etc.). Hereinafter, the term "driving environment" should be understood to include all environments in which an autonomous motion (e.g., SAE Level 5 and SAE Level 4 systems), conditional autonomous motion (e.g., SAE Level 3 systems), and/or motion of vehicles equipped with driver assistance technology (e.g., SAE Level 2 systems) can occur. Additionally, "driving environment" can include any possible flying environment of an aircraft (or spacecraft) or a marine environment of a naval vessel. The objects of the driving environment 101 can be located at any distance from the AV, from close distances of several feet (or less) to several miles (or more).

The example AV 100 can include a sensing system 110. The sensing system 110 can include various electromagnetic (e.g., optical, infrared, radio wave, etc.) and non-electromagnetic (e.g., acoustic) sensing subsystems and/or devices. The sensing system 110 can include one or more lidars 112, which can be a laser-based unit capable of determining distances to the objects and velocities of the objects in the driving environment 101. The sensing system 110 can include one or more radars 114, which can be any system that utilizes radio or microwave frequency signals to sense objects within the driving environment 101 of the AV 100. The lidar(s) 112 and or radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. Each of the lidar(s) 112 and radar(s) 114 can include a coherent sensor, such as a frequency-modulated continuous-wave (FMCW) lidar or radar sensor. For example, lidar(s) 112 and/or radar(s) 114 can use heterodyne detection for velocity determination. In some implementations, the functionality of a ToF and coherent lidar (or radar) is combined into a lidar (or radar) unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 and/or radar 114s can be mounted on AV 100.

Lidar 112 (and/or radar 114) can include one or more optical sources (and/or radio/microwave sources) producing and emitting signals and one or more detectors of the signals reflected back from the objects. In some implementations, lidar 112 and/or radar 114 can perform a 360-degree scanning in a horizontal direction. In some implementations, lidar 112 and/or radar 114 can be capable of spatial scanning along both the horizontal and vertical directions. In some implementations, the field of view can be up to 90 degrees in the vertical direction (e.g., with at least a part of the region above the horizon being scanned with lidar or radar signals). In some implementations (e.g., aerospace applications), the field of view can be a full sphere (consisting of two hemispheres).

The sensing system 110 can further include one or more cameras 118 to capture images of the driving environment 101. Cameras 118 can operate in the visible part of the electromagnetic spectrum, e.g., 300-800 nm range of wavelengths (herein also referred for brevity as the optical range). Some of the optical range cameras 118 can use a global shutter while other cameras 118 can use a rolling shutter. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more sonars 116, for active sound probing of the driving environment 101, e.g., ultrasonic sonars, and one or more microphones for passive listening to the sounds of the driving environment 101. The sensing system 110 can also include one or more infrared range cameras 119 also referred herein as IR cameras 119. IR camera(s) 119 can use focusing optics (e.g., made of germanium-based materials, silicon-based materials, etc.) that is configured to operate in the range of wavelengths from microns to tens of microns or beyond. IR camera(s) 119 can include a phased array of IR detector elements. Pixels of IR images produced by camera(s) 119 can be representative of the total amount of IR radiation collected by a respective detector element (associated with the pixel), of the temperature of a physical object whose IR radiation is being collected by the respective detector element, or any other suitable physical quantity.

The sensing data obtained by the sensing system 110 can be processed by a data processing system 120 of AV 100. For example, the data processing system 120 can include a perception system 130. The perception system 130 can be configured to detect and track objects in the driving environment 101 and to recognize the detected objects. For example, the perception system 130 can analyze images captured by the cameras 118 and can be capable of detecting traffic light signals, road signs, roadway layouts (e.g., boundaries of traffic lanes, topologies of intersections, designations of parking places, and so on), presence of obstacles, and the like. The perception system 130 can further receive radar sensing data (Doppler data and ToF data) to determine distances to various objects in the environment 101 and velocities (radial and, in some implementations, transverse, as described below) of such objects. In some implementations, the perception system 130 can use radar data in combination with the data captured by the camera(s) 118, as described in more detail below.

The perception system 130 can include one or more modules to facilitate efficient and reliable detection, identification, and tracking of objects, including an end-to-end tracking system (EET) 132 that can be used to process data provided by the sensing system 110. More specifically, in some implementations, EET 132 can receive data from sensors of different sensing modalities. For example, EET 132 can receive images from at least some of lidar(s) 112, radar(s) 114, (optical range) camera(s) 118, IR camera (s) 119, sonar(s) 116, and so on. EET 132 can include one or more trained machine-learning models (MLMs) that are used to process the received images to detect objects depicted in the images and to perform linkage of depictions of the objects in different images in order to establish tracks characterizing motion and other evolution of the objects. In some implementations, EET 132 can use a set prediction model (SPM) 134 trained to process together an entire series of images that depict evolution of the environment for multiple instances of time, as described in more detail below. SPM 134 can further deploy multiple classification heads to output bounding boxes, types, sizes, poses, velocity/acceleration, and other characteristics of the tracked objects. SPM 134 or various other models of EET 132 can be trained using multiple sets of images, annotated to identify objects in individual images as well as inter-image associations of these objects. During inference, SPM 134 or other models of EET 132 can determine tracks by identifying associations of depictions of the same objects in different images. In some implementations, identification of such associations can be performed using neural networks with attention layers, which are trained to identify correlations between similar depictions in different images.

The perception system 130 can further receive information from a Global Navigation Satellite System (GLASS) positioning subsystem (not shown in FIG. 1), which can include a GNNS transceiver (not shown), configured to obtain information about the position of the AV relative to Earth and its surroundings. The positioning subsystem can use the positioning data, e.g., GNNS and inertial measurement unit (IMU) data in conjunction with the sensing data to help accurately determine the location of the AV with respect to fixed objects of the driving environment 101 (e.g. roadways, lane boundaries, intersections, sidewalks, crosswalks, road signs, curbs, surrounding buildings, etc.) whose locations can be provided by map information 124. In some implementations, the data processing system 120 can receive non-electromagnetic data, such as audio data (e.g., ultrasonic sensor data from sonar 116 or data from microphone picking up emergency vehicle sirens), temperature sensor data, humidity sensor data, pressure sensor data, meteorological data (e.g., wind speed and direction, precipitation data), and the like.

The data processing system 120 can further include an environment monitoring and prediction component 126, which can monitor how the driving environment 101 evolves with time, e.g., by keeping track of the locations and velocities of the animated objects (e.g., relative to Earth). In some implementations, the environment monitoring and prediction component 126 can keep track of the changing appearance of the environment due to a motion of the AV relative to the environment. In some implementations, the environment monitoring and prediction component 126 can make predictions about how various animated objects of the driving environment 101 will be positioned within a prediction time horizon. The predictions can be based on the current state of the animated objects, including current locations (coordinates) and velocities of the animated objects. Additionally, the predictions can be based on a history of motion (tracked dynamics) of the animated objects during a certain period of time that precedes the current moment. For example, based on stored data for a first object indicating accelerated motion of the first object during the previous 3-second period of time, the environment monitoring and prediction component 126 can conclude that the first object is resuming its motion from a stop sign or a red traffic light signal. Accordingly, the environment monitoring and prediction component 126 can predict, given the layout of the roadway and presence of other vehicles, where the first object is likely to be within the next 3 or 5 seconds of motion. As another example, based on stored data for a second object indicating decelerated motion of the second object during the previous 2-second period of time, the environment monitoring and prediction component 126 can conclude that the second object is stopping at a stop sign or at a red traffic light signal. Accordingly, the environment monitoring and prediction component 126 can predict where the second object is likely to be within the next 1 or 3 seconds. The environment monitoring and prediction component 126 can perform periodic checks of the accuracy of its predictions and modify the predictions based on new data obtained from the sensing system 110. The environment monitoring and prediction component 126 can operate in conjunction with EET 132. For example, the environment monitoring and prediction component 126 can track relative motion of the AV and various objects (e.g., reference objects that are stationary or moving relative to Earth); in some implementations.

The data generated by the perception system 130, the GNSS processing module 122, and the environment monitoring and prediction component 126 can be used by an autonomous driving system, such as AV control system (AVCS) 140. The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, EET 132 can determine that the last 10 frames of a camera include images of a moving object and can further classify the object as a jogger running with speed of 8 mph along the roadway. Responsive to such a determination, the data processing system 120 can determine that the vehicle needs to slow down until a safe speed is reached. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; and (3) engage a brake unit to reduce (while acting in concert with the engine and the transmission) the vehicle's speed until the safe speed is reached. In the meantime, EET 132 can continue tracking the jogger and can predict that the jogger is about to cross the roadway. Responsive to receiving such a prediction, the AVCS 140 can output instructions to the powertrain, brakes, and steering 150 to further increase the pressure on the brakes and to bring the AV to a stop or to perform, using a power steering mechanism, a steering maneuver until the jogger (or any other object) is safely bypassed. Subsequently, the AVCS 140 can output instructions to the powertrain, brakes, and steering 150 to resume the previous speed settings of the vehicle.

Figure 2:
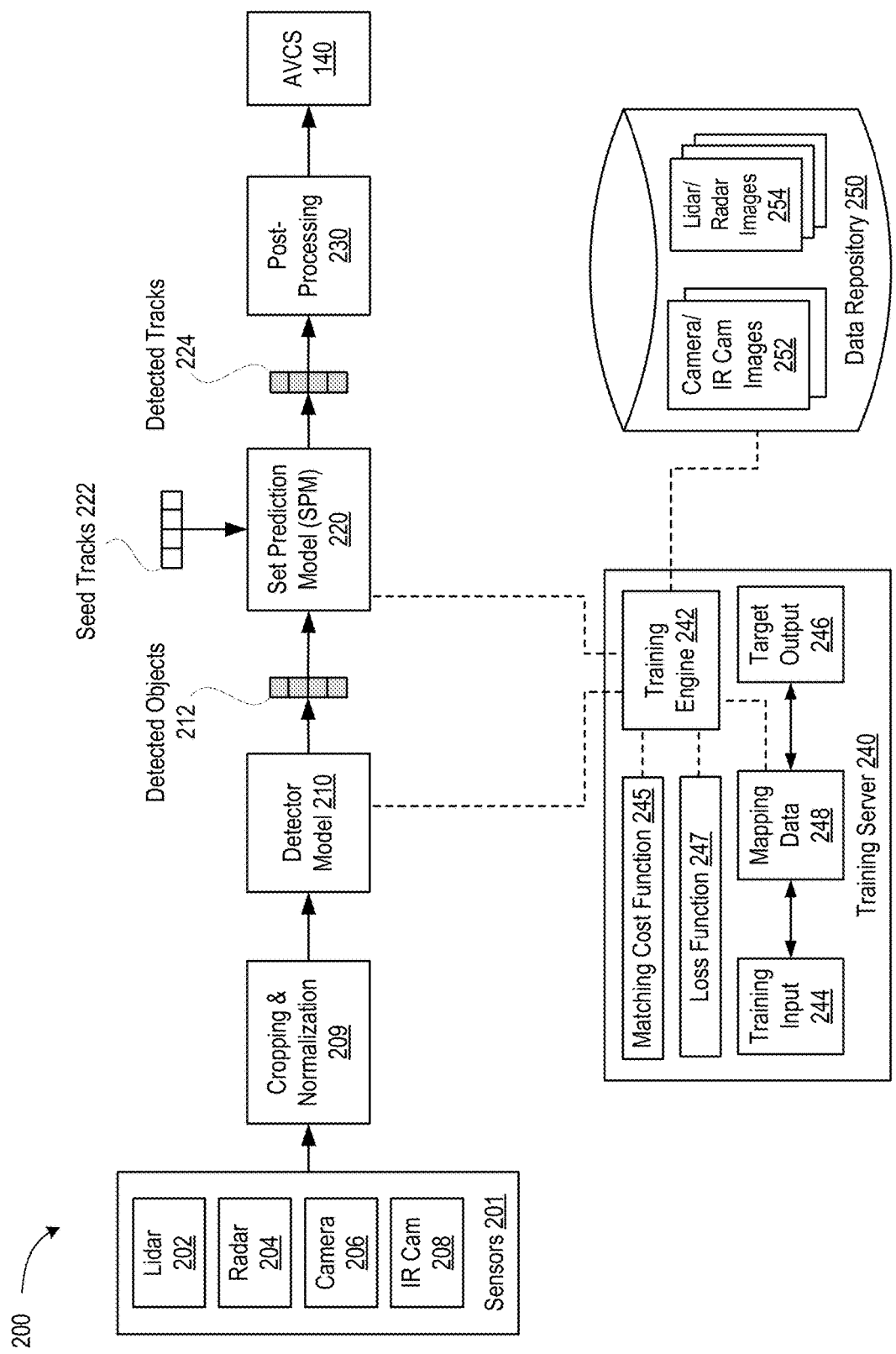
FIG. 2 is a diagram illustrating example architecture of a part of a perception system that is capable of end-to-end identification and tracking of objects, in accordance with some implementations of the present disclosure.

FIG. 2 is a diagram illustrating example architecture 200 of a part of a perception system that is capable of end-to-end identification and tracking of objects, in accordance with some implementations of the present disclosure. An input into the perception system (e.g., perception system 130 of FIG. 1) can include data obtained by various components of the sensing system 110, e.g., sensors 201, which can include lidar sensor(s) 202, radar sensor(s) 204, optical (e.g., visible) range camera(s) 206, IR camera(s) 208, and so on. The data output by various sensors 201 can include directional data (e.g., angular coordinates of return points), distance data, and radial velocity data, e.g., as can be obtained by lidar sensor(s) 202 and/or radar sensor(s) 204. The data output by various sensors 201 can further include pixel data obtained by optical range camera(s) 206 and pixel data obtained by IR camera(s) 208. The data outputted by a particular sensor (e.g., lidar 202) in association with a particular instance of time is referred to herein as an image (e.g., a lidar image). A set of all available images (a lidar image, a radar image, a camera image, and/or an IR camera image, etc.) associated with a specific instance of time is referred to herein as a sensing frame or, simply, frame. In some implementations, the images obtained by different sensors can be synchronized, so that all images in a given sensing frame have the same (up to an accuracy of synchronization) timestamp. In some implementations, some images in a given sensing frame can have (controlled) time offsets. It should be understood that any frame can include all or only some of the data modalities, e.g., only lidar data and camera data, or only camera data.

An image obtained by any of the sensors can include a corresponding intensity map $I(\{x_j\})$ where $\{x_j\}$ can be any set of coordinates, including three-dimensional (spherical, cylindrical, Cartesian, etc.) coordinates (e.g., in the instances of lidar and/or radar images), or two-dimensional coordinates (in the instances of camera data). Coordinates of various objects (or surfaces of the objects) that reflect lidar and/or radar signals can be determined from directional data (e.g., polar $\theta$ and azimuthal $\phi$ angles in the direction of lidar/radar transmission) and distance data (e.g., radial distance R determined from the ToF of lidar/radar signals). The intensity map can identify intensity of sensing signals detected by the corresponding sensors. Similarly, lidar and/or radar sensors can produce a Doppler (frequency shift) map, $\Delta f(\{x_j\})$ that identifies (radial) velocity V of reflecting objects based on a detected Doppler shift $\Delta f$ of the frequency of the reflected radar signals, $V = \lambda \Delta f / 2$, where $\lambda$ is the lidar/radar wavelength, with positive values $\Delta f > 0$ associated with objects that move towards the lidar/radar (and, therefore, the vehicle) and negative values $\Delta f < 0$ associated with objects that move away from the lidar/radar. In some implementations, e.g., in driving environments where objects are moving substantially within a specific plane (e.g., parallel to ground), the radar intensity map and the Doppler map can be defined using two-dimensional coordinates, such as the radial distance and azimuthal angle: $(R, \phi)$, $\Delta f(R, \phi)$. Lidar and/or radar data can be identified with timestamps.

Camera(s) 206 can acquire one or more sequences of images, which can be similarly identified with timestamps. Each image can have pixels of various intensities of one color (for black-and-white images) or multiple colors (for color images). Images acquired by camera(s) 206 can be panoramic images or images depicting a specific portion of the driving environment, such as a large (e.g., panoramic) image segmented into smaller images or images acquired by limited-view cameras (e.g., frontal-view cameras, rear-view cameras, side-view cameras, etc.). Infrared camera(s) 208 can similarly output one or more sequences of IR images. Each IR image can be obtained by an array of infrared detectors, which can operate in the range of wavelengths from microns to tens of microns or beyond. The IR images can include intensity $I(\{x_j\})$ representative of the total amount of IR radiation collected by a respective detector. In some implementations, the IR images can include a pseudo-color map $C_i(\{x_j\})$ in which the presence of a particular pseudo-color $C_i$ can be representative of the collected total intensity $I(\{x_j\})$. In some implementations, the collected intensity $I(\{x_j\})$ can be used to determine a temperature map $T(\{x_j\})$ of the environment. Accordingly, in different implementations, different representations (e.g., intensity maps, pseudo-color maps, temperature maps, etc.) can be used to represent the IR camera data.

In some implementations, sensors 201 can output portions of sensing frames in association with particular segments of the driving environment. For example, data generated by a frontal-view optical range camera can be bundled with data generated with a frontal-view IR camera and further bundled with a portion of lidar and/or radar data obtained by sensing beams transmitted within a certain (e.g., forward-looking) segment of the lidar and/or radar cycle that corresponds to the field of view of the frontal view cameras. Similarly, a side-view camera data can be bundled with a lidar and/or radar data obtained by the sensing beams transmitted within a respective side-view segment of the lidar and/or radar scanning.

Architecture 200 can include a cropping and normalization module 209 that can crop one or more portions of sensing data of any particular sensing frame. For example, cropping and normalization module 209 can select (crop) a portion of sensing data for a particular sector of view, e.g., forward view, side view, rearward view, etc. In some implementations, cropping and normalization module 209 can combine available data of different sensing modalities, e.g., lidar images, radar images, optical range camera images, IR camera images, and the like, such that the data for different sensing modalities correspond to the same regions of the driving environment. The combined data can associate intensities of multiple modalities (e.g., camera intensities and lidar intensities) with the same pixel (or voxel) corresponding to a given region of the environment.

Cropping and normalization module 209 can resize each image to match the size of an input into a detector model 210. For example, if detector model 210 is configured to process inputs of dimension $n \times m$ while a cropped portion of a camera image has a size of $N \times M$ pixels, cropping and normalization module 209 can resize, e.g., downscale or upscale, the cropped portion, depending on whether the cropped portion is larger or smaller than the size of detector model 210 inputs. In some implementations, the rescaling is performed while preserving the aspect ratio of the cropped portion. For example, if the dimension of detector model 210 inputs is 256×192 pixels, and the size of the cropped portion is 96×96 pixels, cropping and normalization module 209 can upscale the cropped portion using a rescaling factor 2, such that the resized portion has the size of is 192×192 pixels. Because the size of the upscaled portion is less than the size of detector model 210 inputs, the upscaled portion can then be padded to the size of 256×192 pixels, e.g., using padding pixels. The intensity of the padding pixels can be the average intensity of the pixels of the cropped portion, the intensity of edge pixels, a nominal intensity, or any other suitably chosen intensity.

In some implementations, cropping and normalization module 209 can normalize the intensity of the pixels of the cropped portion to a preset range of intensities, e.g., [$I_{min}$, $I_{max}$], where $I_{min}$ is the minimum intensity and $I_{max}$ is the maximum intensity that detector model 210 is configured to process. In some implementations, the minimum intensity can be zero, $I_{min}=0$. The intensity rescaling factor can be determined by identifying the maximum intensity $i_{max}$ in the cropped portion, e.g., $R=I_{max}/i_{max}$. Each pixel intensity can then be rescaled using the determined factor R. Since different sensing modalities can have different intensities (including the maximum intensities $i_{max}$), different rescaling factors R can be used for lidar/radar/camera/IR camera images and portions of the images. Additionally, cropping and normalization module 209 can perform other preprocessing of the cropped portions including filtering, denoising, and the like.

Detector model 210 can process all, some, or a single data modality output by sensors 201 (e.g., only camera data or both camera data and lidar data, etc.) to detect presence of various objects in the driving environment. Detection model 210 can be any suitable machine-learning model that detects presence of objects in images and outputs detected objects 212 using any suitable indications, e.g., 2D or 3D bounding boxes for the depictions of the detected objects 212 in the input images. Detection model 210 can deploy one or more MLMs that can use lookup-tables, geometric shape mapping, mathematical formulas, decision-tree algorithms, support vector machines, deep neural networks, etc., or any combination thereof.. Deep neural networks can include convolutional neural networks, recurrent neural networks (RNN) with one or more hidden layers, fully connected neural networks, long short-term memory neural networks, Boltzmann machines, and so on, or any combination thereof.

A set prediction model (SPM) 220 can process the detected objects 212 for a plurality of N frames together, as described in more detail below in conjunction with FIG. 3. SPM 220 can use seed tracks 222, which can initially be assigned random values or some fixed values. The number M of seed tracks 222 can be substantially higher than the number of typical objects encountered in N consecutive frames for a particular application-specific environment, e.g., a driving environment, a traffic control environment, a manufacturing line environment, etc. Detected tracks 224 can include a number of tracks associated with the motion of the detected objects across all N frames (or some of the N frames, if an object is present for a fraction of the N frames). Each detected track can be characterized by some or all of the following: bounding boxes for depictions of a particular object in multiple frames (e.g., up to N frames), type of the object, size of the object, pose of the object, motion of the object (e.g., velocity, acceleration, etc.), and the like. In some implementations, the total number of detected tracks can be equal to the number M of seed tracks 222 (e.g., can be substantially larger than the actual number of tracks m), but processing by SPM 220 can successfully identify that M-m seed tracks are non-tracks. For example, each of the tracks can be associated with a status bit (SB) having values indicative of a track (SB=1) or a non-track (SB=0). In the course of processing by SPM 220, m of the M seed tracks, which correspond to the tracks of the actual objects, can acquire a status bit SB=1 value and the corresponding track information, e.g., bounding boxes, poses, types, velocities, etc. At the same time, the remaining M-m seed tracks can end up having a status bit SB=0 value.

Detected tracks 224 can undergo additional post-processing 230 that can include matching tracks determined for different (e.g., consecutive) batches of frames. This track matching can be used to determine and output continuous (across multiple batches) trajectories of detected objects. For example, track for object A within the first N frames obtained at times $t_1, t_2 \ldots t_N$ can be linked with a track for the same object A within the second N frames obtained at times $t_{N+1}, t_{N+2} \ldots t_{2N}$, and so on. Post-processing 230 can further include generating any graphical, e.g., pixel-based (e.g., heat map) or vectorized (curve-based), representations of the tracks, including trajectories, poses, speed regime of various objects, and the like. In some implementations, post-processing 230 can include processing the detected tracks using one or more models that predict motion of the detected object, e.g., a model that tracks velocity, acceleration, etc., of the detected objects. For example, a Kalman filter or any other suitable filter, which combines predicted motion of a particular object with the detected motion (e.g., based on the SPM processing of the last N, 2N, etc., frames) of the object, can be used for more accurate estimation of the location and motion of the object.

Tracking data generated by SPM 220 and post-processing 230 can be provided to AVCS 140. AVCS 140 evaluates the trajectories of the objects in various tracks and determines whether to modify the current driving trajectory of the vehicle in view of the location and speed of the tracked objects. For example, if a tracked pedestrian or bicyclist is within a certain distance from the vehicle, the AVCS 140 can slow the vehicle down to a speed that ensures that the pedestrian or bicyclist can be safely avoided. Alternatively, AVCS 140 can change lanes, e.g., if an adjacent lane is free from obstructions, or perform some other driving maneuver.

Training can be performed by a training engine 242 hosted by a training server 240, which can be an outside server that deploys one or more processing devices, e.g., central processing units (CPUs), graphics processing units (GPUs), etc. In some implementations, detector model 210 and/or SPM 220 can be trained by training engine 242 and subsequently downloaded onto the vehicle that deploys perception system 130. Detector model 210 and SPM 220 can be trained, as illustrated in FIG. 2, using training data that includes training inputs 244 and corresponding target outputs 246 (correct matches for the respective training inputs). During training of detector model 210 and/or SPM 220, training engine 242 can find patterns in the training data that map each training input 244 to the target output 246.

In some implementations, detector model 210 and SPM 134 can be trained separately using sensing images and other data that have been recorded during driving missions and annotated with ground truth. For training of detector model 210, ground truth can include correct identification of locations (e.g., bounding boxes) of various objects in individual images or frames. For training of SPM 220, ground truth can include correct linkage of the same objects across batches of multiple images/frames, correct types and sizes of the various objects depicted in the images/frames, correct locations and velocities of the objects, and the like. Training images can include images obtained by the sensors of the specific modalities that are to be deployed on a particular autonomous driving or driver assistance platform. For example, a particular SPM 220 that is intended to be used with lidar data, optical range camera data, and IR data can be trained with the corresponding sets of training data obtained with lidars, optical range cameras, and IR cameras. During training of a different SPM 220 that is to be used with radar data in place of the lidar data, the lidar training images can be replaced with radar training images.

Training engine 242 can have access to a data repository 250 storing multiple camera/IR camera images 252 and lidar/radar images 254 obtained during driving situations in a variety of driving environments (e.g., urban driving missions, highway driving missions, rural driving missions, etc.). During training, training engine 242 can select (e.g., randomly), as training data, a number of sets of camera/IR camera images 252 and sets of lidar/radar images 254. Training data can be annotated with correct object identifications. In some implementations, annotations can be made by a developer before the annotated training data is placed into data repository 250. Annotated training data retrieved by training server 240 from data repository 250 can include one or more training inputs 244 and one or more target outputs 246. Training data can also include mapping data 248 that maps training inputs 244 to target outputs 246. For example, mapping data 248 can identify a bounding box of a passenger car in each of a batch of N consecutive frames obtained by a forward-facing camera of a vehicle. The mapping data 248 can include an identifier of the training data, a location of the passenger car, size and identification of the passenger car, speed and direction of motion of the passenger car, and other suitable information.

During training of SPM 220, training engine 242 can use a matching cost function 245 to identify tracks that are the closest to the ground truth tracks. More specifically, a batch of N training frames can include m ground truth tracks. Because the output of SPM 220 can be agnostic about which m of M seeded (and subsequently learned) tracks are the actual tracks and which M−m seeded tracks are null tracks (non-tracks), training engine 242 can use matching cost function 245 to identify, for each of m ground truth tracks and from M available tracks, a track that has the lowest mismatch (cost) with the respective ground truth track. Such a track-to-track assignment can be performed using the Hungarian algorithm that solves the combinatorial optimization problem based on the total cost (mismatch) between the target (ground truth) tracks and tracks output during training by SPM 220. Matching cost function 245 can be any suitable function, including mean square error function, mean absolute error function, mean bias error function, cross-entropy function, and the like. Matching cost function 245 can be based on bounding box mismatch, type-of-object mismatch, size-of-object mismatch, motion (velocity/acceleration) mismatch, or any (e.g., weighted) combination thereof, and so on. After m best matching tracks are identified, training engine 242 can use a loss function 247 for all pairs of tracks identified as described above, to compute bounding box/type/size/motion mismatch within each pair. In some implementations, loss function 247 can be the same as matching cost function 245. In some implementations, loss function 247 can be different from matching cost function 245.

During training of detector model 210 and/or SPM 220, training engine 242 can change parameters (e.g., weights and biases) of SPM 220 (and similarly of detector model 210) until the model successfully learns how to minimize loss function 247 and, therefore, identify and classify target outputs 246, e.g., detect various objects and tracks of objects. In some implementations, detector model 210 and/or SPM 220 can be trained separately, e.g., with detector model 210 trained using object-level ground truth and SPM 220 trained using track-level ground truth. In some implementations, detector model 210 and/or SPM 220 can be trained together, e.g., using only track-level ground truth (without the object-level ground truth). In various implementations, SPM 220 can be trained to have different precision and resolution, depending on a specific application. Correspondingly, different SPM 220 can have different architectures (e.g., different numbers of neuron layers and different topologies of neural connections) and can have different settings (e.g., activation functions, etc.).

The data repository 250 can be a persistent storage capable of storing lidar/radar/camera/IR camera images and other data, as well as data structures configured to facilitate an end-to-end identification and tracking of objects, in accordance with implementations of the present disclosure. The data repository 250 can be hosted by one or more storage devices, such as main memory, magnetic or optical storage disks, tapes, or hard drives, network-attached storage (NAS), storage area network (SAN), and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2).

Figure 3:
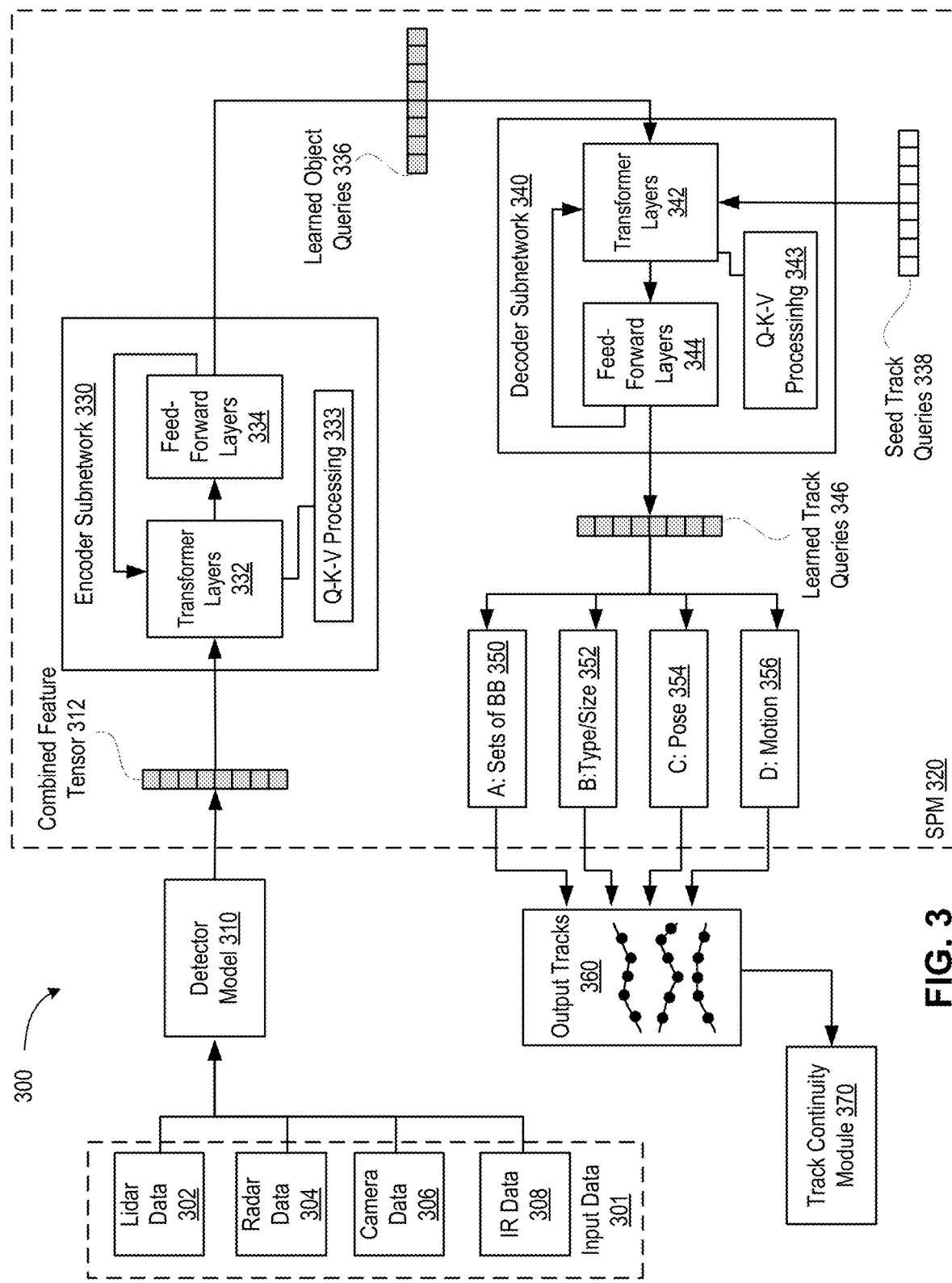
FIG. 3 is a schematic diagram illustrating example operations of fast and accurate end-to-end identification and tracking of objects, in accordance with some implementations of the present disclosure.

FIG. 3 is a schematic diagram illustrating example operations 300 of fast and accurate end-to-end identification and tracking of objects, in accordance with some implementations of the present disclosure. The end-to-end identification and tracking illustrated in FIG. 3 can implement operation of EET 132 of the perception system 130 depicted in FIG. 1. In one implementation, end-to-end identification and tracking can include multiple neural networks (NNs), including a detector model 310, a set prediction model (SPM) 320, and/or other networks or subnetworks not explicitly depicted in FIG. 3. In some implementations, SPM 320 can be SPM 134 of FIG. 1 and/or SPM 220 of FIG. 2. Similarly, detector model 310 can be detector model 210 of FIG. 2. Although depicted as separate blocks in FIG. 3, various illustrated NNs and subnetworks can be parts of the same NN, which are trained jointly. Neurons in the neural networks are associated with learnable weights and biases. The neurons can be arranged in layers. Some of the layers can be hidden layers. Each of the NNs or subnetworks depicted in FIG. 3 can include multiple hidden neuron layers and can be configured to perform one or more functions that facilitate identification and tracking of objects.

Input data 301 into EET 132 can include data from one or more sensing modalities, including but not limited to a lidar data 302, a radar data 304, a camera data 306, an IR data 308, and the like. Each of the input data can have a digital pixelated form representing three-dimensional (3D) intensity maps $I(x_1,x_2,x_3)$ or a two-dimensional (2D) intensity maps, $I(x_1,x_2)$. In some implementations, 2D intensity maps (e.g., lidar and/or radar intensity maps) can represent a specific slice of the 3D intensity for a specific height $x_3=h$ above the ground, e.g., $I(x_1,x_2,h)$, or a maximum value with respect to the vertical coordinate, $I(x_1,x_2)=\{I(x_1,x_2,x_3):x_3\}$, or an average value of $I(x_1,x_2,x_3)$ within some interval of heights, $x_3 \in (a, b)$, or some other suitable value. In some implementations, lidar data 302 and/or radar data 304 can include a 3D Doppler shift/velocity intensity map $V(x_1,x_2,x_3)$ or its corresponding 2D projection (e.g., determined as described above fin relation to the intensity I). It should be understood that coordinates $(x_1,x_2,x_3)$ or $(x_1,x_2)$ are not limited to Cartesian coordinates and can include any suitable system of coordinates, e.g., a spherical coordinate system, cylindrical coordinate system, elliptical coordinate system, polar coordinate system, and so on. In some implementations, a coordinate system can be a non-orthogonal coordinate system, e.g., an affine coordinate system.

Camera data 306 and IR data 308 can include images in any suitable digital format (JPEG, TIFF, GIG, BMP, CGM, SVG, and so on). Each image can include a number of pixels. The number of pixels can depend on the resolution of the image. Each pixel can be characterized by one or more intensity values. A black-and-white pixel can be characterized by one intensity value representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, e.g., by three intensity values (e.g., if the RGB color encoding scheme is used) or four intensity values (e.g., if the CMYK color encoding scheme is used). Each of the images in the input data 301 can be preprocessed prior to being input into EET 132, e.g., downscaled (with multiple pixel intensity values combined into a single pixel value), upsampled, filtered, denoised, and the like.

In some implementations, images included in input data 301 (e.g., any of camera data 306 and IR data 308, as well as in lidar data 302 and/or radar data 304) can be large images that depict the same (or approximately the same) region of the driving environment. In some implementations, input data 301 can include portions (patches) of the larger images, cropped by cropping and normalization module 209, as described above in relation to FIG. 2. Detector model 310 can be any suitable model trained to identify objects within input data 301. In some implementations, detector model 310 can include multiple convolutional neuron layers and one or more fully connected layers. The convolutions performed by detector model 310 can include any number of kernels of different dimensions trained to capture both the local as well as global context within the input frames (images). The output of detector model 310 can include any suitable parameterization of the regions of frames occupied by objects depicted therein, e.g., (X, Y, W, H, S, t) parameterization, which can include coordinates of the center of the bounding box of an object (X, Y), a width and height of the bounding box (W, H), a time stamp t of the frame, and any additional semantic information S, which can be an embedding charactering an appearance of the object (e.g., shape, color, representative features, and the like). Any other suitable bounding boxes, e.g., non-rectangular bounding boxes, can be output by detector model 310.

In some implementations, detector model 310 can include a backbone subnetwork (e.g., a set of common layers of neurons) and a set of separate output heads trained to output geometric information (bounding boxes), semantic information (appearance of the objects), contextual information (location of the objects relative to the roadway), and so on. Although in the above example a bounding box is a two-dimensional box, in various implementations, three-dimensional bounding boxes can be used in a similar fashion, e.g., (X, Y, Z, W, H, D, S, t), with the additional third coordinate Z being the center of the box and the D being the depth of the box. In some instances, the depth parameters can be obtained based on lidar or radar ranging data. In some instances, the depth parameters can be obtained using a suitable 2D-to-3D lifting transformation, which can be based on focal distance(s) of the optical camera(s) used to image specific objects in the environment.

Figure 4:
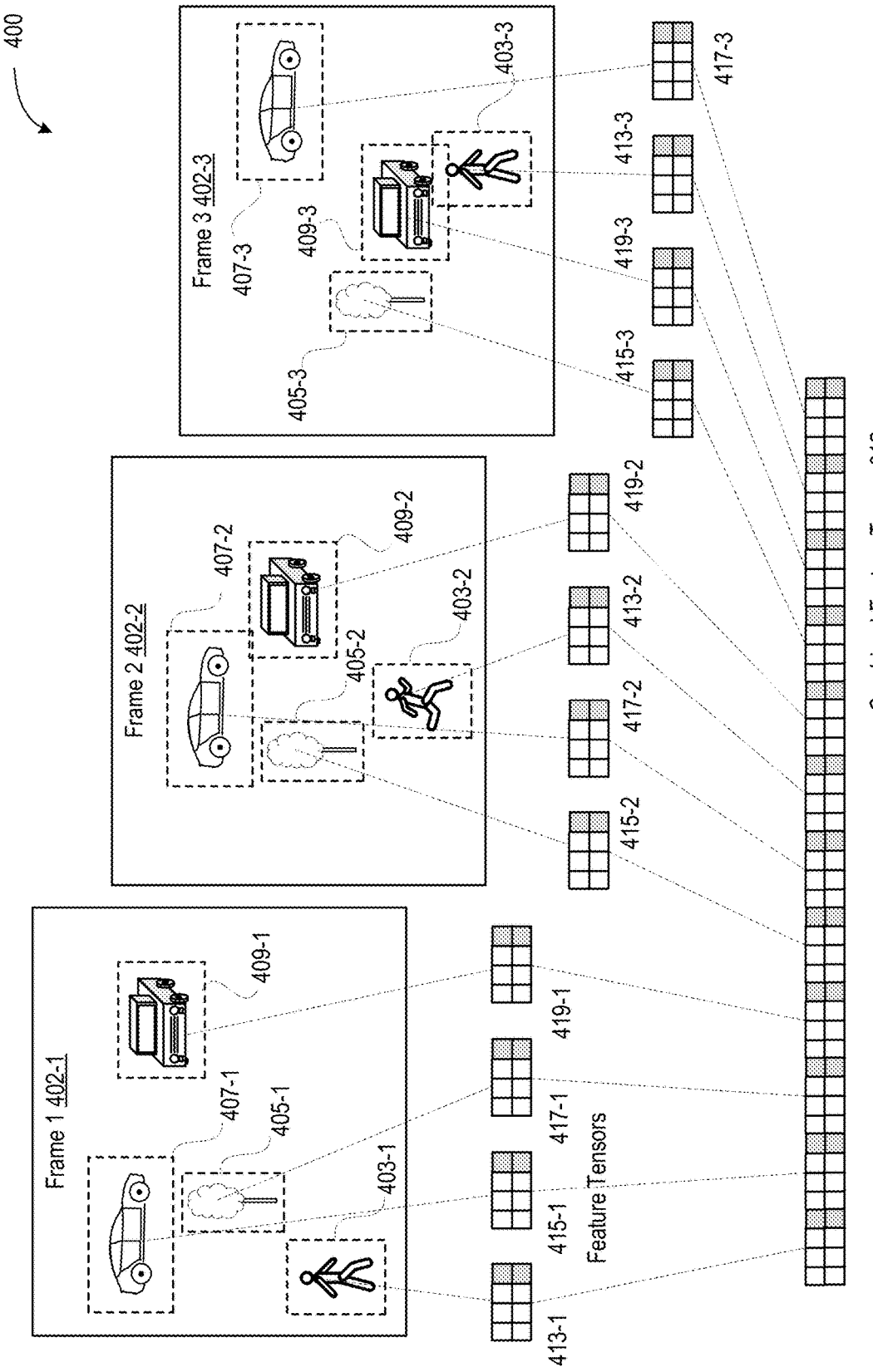
FIG. 4 illustrates schematically an output of a detector model, in accordance with some implementations of the present disclosure.

FIG. 4 illustrates schematically an output 400 of detector model 310, in accordance with some implementations of the present disclosure. Three frames 402-1, 402-2, and 402-3 having three different time stamps, e.g., $t_1, t_2, t_3$, are depicted in FIG. 4. Frames 402-n can be frames obtained using the same sensing modality (e.g., camera), different sensing modalities (e.g., some of the images can be obtained by camera and some of the images can be obtained by a lidar/radar), or can be a combination of different sensing modalities. For example, any given image cam be or include a camera data superimposed on the lidar and/or radar data, e.g., using directional correspondence of camera and/or radar sensing fields of view. As illustrated, frame 1 402-1 includes four detected objects, enclosed by a respective bounding box: a walking pedestrian 403-1, a stationary tree 405-1, a passenger car 407-1, and a pick-up truck 409-1. The objects detected in frame 1 402-1 can be represented by a first set of feature tensors output by detector model 310. For the objects detected in frame 1 401, the feature tensors of the first set can include feature tensors 413-1 . . . 419-1, the associations of the feature tensors with the respective objects being indicated with dashed lines. Similarly, frame 2 402-2 can include the four detected objects located at the same location (tree 405-2) or different locations (running pedestrian 403-2, passenger car 407-2, pickup truck 409-2) and represented by a respective feature tensor 413-2 . . . 419-2 of the second set of feature tensors output by detector model 310. Likewise, frame 3 402-3 can include the same four detected objects 403-3 . . . 409-3 and represented by the feature tensors 413-3 . . . 419-3 of the third set.

The output feature tensors of different sets can be joined into a single combined feature tensor 312, which is used as an input into SPM 320 of FIG. 3. Individual feature tensors can be concatenated in the combined feature tensor 312, or otherwise appended. As illustrated in FIG. 4, the order in which individual feature tensors are concatenated can be arbitrary. Similarly, the output of detector model 310 need not be ordered by a type of the object (or any other semantic information). This allows detector model 310 to be lightweight and, in some implementations, output as little information as the location and size of the bounding boxes for each image. The actual identification of the associations (correlations) of different bounding boxes/objects can be performed by SPM 320 in the course of solving the set prediction problem of selecting similar objects from the set of boxes/objects identified (by detector model 310) within all frames 402-n.

With a continued reference to FIG. 3, combined feature tensor 312 can be input into SPM 320. SPM 320 can have a transformer architecture or any other similar architecture that uses attention layers. In some implementations, SPM 320 can include a number of subnetworks, such as an encoder subnetwork 330, a decoder subnetwork 340, and one or more classification heads 350-356. Encoder subnetwork 330 can include a set of transformer layers 332 and a set of feed-forward layers 334. As depicted schematically with the curved arrow, encoder subnetwork 330 can include a stack of repeated sequences of transformer layers 332 and feed-forward layers 334. Additionally, each sequence in the stack can include a number of normalization layers.

Transformer layers 332 can include self-attention layers that use query-key-value (Q-K-V) processing 333, which, at the outset, can take a feature tensor $FV_i$ associated with i-th bounding box and form a query vector $q_i=W_q \cdot FV_i$, a key vector $k_i=W_k \cdot FV_i$, and a value vector $v_i=W_v \cdot FV_i$, using matrix products of feature tensor $FV_i$ with an object query weight matrix $W_q$, a key weight matrix $W_k$, and a value weight matrix $W_v$, whose elements are determined (learned) during training of SPM 320. At each round of self-attention processing, each query vector $q_i$ can be compared to all key vectors $k_j$, e.g., by computing attention (correlation) coefficients (such as scalar dot products $a_{ij}=q_i^T \cdot k^j$). The attention coefficients characterize how strongly the i-th object is associated (correlated) with or influenced by the j-th object. Since query weight matrix $W_q$ is, generally, different from key weight matrix $W_k$, the attention coefficients can be asymmetric, $a_{ij} \neq a_{ji}$, which reflects the fact that object i, in general, can affect object j differently relative to how object j affects object i. For example, the motion of a vehicle can be strongly affected by the status of a street light, but the status of the street light can be fully independent of the presence of the vehicle (e.g., in the instances of major intersections) or partially dependent on such presence (e.g., in the instances of less frequently traveled intersections equipped with vehicle detectors and capable of changing lights if no cross-traffic is currently present).

The computed attention coefficients can be used to update the object query vectors, which can be performed as follows, $q_i \rightarrow q_i + \Sigma_j f(\alpha_{ij})v_j$, e.g., by weighting all available value vectors, using an attention function $f(z)$, which can be the softmax function or any other suitable classifier function, and adding to the previously stored object query vectors. In some implementations, the argument of the attention function can be scaled using some function of the number N of detected objects, e.g., as $f(z/\sqrt{N})$. This operation of updating the object query vectors allows encoder subnetwork 330 to recompute feature tensors $FV_i$ of each object (represented now by the corresponding object query vector $q_i$) in view of the presence of various other objects. The feed-forward layers 334 can include fully-connected layers. In some implementations, at least some of feed-forward layers 334 can be convolutional layers. The feed-forward layers 334 can further include one or more activation functions, such as a rectified linear unit (ReLU), leaky ReLU, parametric ReLU, sigmoid, or any other suitable activation function. In some implementations, the output of each self-attention layer and/or feed-forward layer may be added to the input into the layer before being provided as the input into the next layer (or as the final output of encoder subnetwork 330). In some implementations, any or all of the self-attention layers and/or the feed-forward layers can be followed with a normalization layer.

After the processing of object vector queries by encoder subnetwork 330 is compete, the output of the processing represents the learned object queries 336. Even though the learned object queries 336 are depicted in FIG. 3 as a single vector, this vector can represent a concatenated set of individual learned object queries. This set of learned object queries can be input into a decoder subnetwork 340. Further input into decoder subnetwork 340 can include a set of seed track queries 338. The function of decoder subnetwork 340 is to transform seed track queries 338 into a set of learned track queries 346 in view of learned object queries 336. The number of seed track queries M (and of the learned track queries) can be sufficiently large to exceed the number of moving objects in typical environments for a given application of interest. For example, the number of seed (and learned) track queries can be substantially larger than the typical number of objects (vehicles, pedestrians, pieces of construction equipment) encountered within an area accessible to the sensing system of the vehicle.

Seed track queries 338 can be input into decoder subnetwork 340 that includes a set of additional transformer layers 342 (which can include self-attention layers and cross-attention layers) and a set of feed-forward layers 344. As depicted schematically with the curved arrow, decoder subnetwork 340 can include a stack of multiple sequences of transformer layers 342 and feed-forward layers 344. Each stack can also include addition and normalization layers.

Transformer layers 342 can also use a query-key-value (Q-K-V) processing 343, which, at the outset, can take seed track queries $ST_j$ associated with j-th track, e.g.

$$ST_j=[(X_{j1}, Y_{j1}, W_{j1}, H_{j1}, t_1), (X_{j2}, Y_{j2}, W_{j2}, H_{j2}, t_2) \ldots (X_{jN}, Y_{jN}, W_{jN}, H_{jN}, t_N)],$$

with randomly seeded values $X_{j1}, Y_{j1}, \ldots$ etc. Track queries $TQ_1=U_q \cdot ST_j$ can then be formed similar to object queries $q_i$ above, e.g., using a matrix product with a track query weight matrix $U_q$. In some implementations, key vectors $K_j$ and value vectors $V_j$ can be defined using additional weight matrices, and based on feature tensors $FV_i$ output by detector model 310. The elements of the weights matrices of transformer (e.g., cross-attention) layers 342 can also be determined during training of SPM 320. At each round of transformer/cross-attention processing, each query vector $Q_j$ can again be compared to all key vectors $K_j$, e.g., by computing cross-attention coefficients (as described above) and using the cross-attention coefficients to obtain linear combinations of value vectors that are added to the last stored query vector $Q_j$. As a result, query vectors $Q_j$ learn to associate various detected objects in some or all frames with different tracks. Unlike the processing by transformer layers 332 (including self-attention layers), which use the queries $q_i$ and the keys $k_j$ that are both associated with the detected objects, transformer 342 use the queries $Q_j$ associated with learned tracks and the keys $K_j$ that are still associated with the detected objects.

Similarly to operations of encoder subnetwork 330, decoder subnetwork 340 can use any suitable activation function g(.) to determine the weights with which value vectors $V_j$ enter the updated track queries, e.g., $Q_j \rightarrow Q_j + \Sigma_l g(\beta_{jl}/\sqrt{M})V_l$, where M can be the total number of seeded tracks that is significantly larger than the likely number of objects in the environment. As the track queries are being updated with each layer of transformer/cross-attention, the resulting learned queries can converge to the actual number of tracks, e.g., m, whereas the remaining M–m tracks take progressively smaller numbers indicative of decreasing likelihood of inter-frame object associations. In some implementations, the activation function g(.) can also be the softmax function or any other suitable classifier. The cross-attention operation of updating the track query vectors allows decoder subnetwork 340 to recompute track queries $Q_j$ in view of the presence of various objects in all frames.

The feed-forward layers 344 can perform additional processing and can include any number of fully-connected (or convolutional) layers. The feed-forward layers 344 can include one or more activation functions, such as a rectified linear unit (ReLU), leaky ReLU, parametric ReLU, sigmoid, or any other suitable activation function. Any or all of the self-attention and cross-attention layers can use a multi-head architecture.

The output of decoder subnetwork 340 can include learned track queries 346, which can be the final values of track queries $Q_j$ or some other numbers that are based on (e.g., functions of) the final values of track queries $Q_j$. The number of (non-zero) learned track queries 346 may be less than the number of seed track queries 338. During processing by decoder subnetwork 340, the initially random values of the seed track queries 338 may evolve in such a way that most of the learned track queries 346 have zero (or small values) while some learned track queries 346, which correspond to the actual tracks, develop substantially larger values. Learned track queries 346 can be processed by one or more classification heads 350-356. Each classification head can include one or more feed-forward layers (e.g., projection layers) and one or more activation functions. For example, head A 350 can output sets of bounding boxes that link bounding boxes of objects that belong to the same track, e.g., bounding boxes of object A can be linked into track $T_A$, $$T_A = [(X_{A1}, Y_{A1}, W_{A1}, H_{A1}, t_1), (X_{A2}, Y_{A2}, W_{A2}, H_{A2}, t_2) \ldots (X_{AN}, Y_{AN}, W_{AN}, H_{AN}, t_N)],$$

bounding boxes of object B can be linked into track $T_B$, and so on. Some tracks can have the number of entries that is the same as the number N of frames. Some tracks can begin later than the time $t_1$ of the first frame or end earlier than the time $t_N$ of the last frame. Some tracks can be temporarily interrupted (e.g., while the respective object is occluded), e.g., a track can include bounding boxes at times $t_1 \ldots t_n$ and bounding boxes at times $t_P \ldots t_N$. Head B 352 can output types and/or sizes of objects associated with each track or the most likely types of objects associated with each track. Head C 354 can output the pose (position and orientation) of objects associated with each track. Head D 356 can output motion information for each track, e.g., likely velocity (speed and direction of motion) and acceleration of the respective object at each or some of the times $t_1 \ldots t_M$. Any number of other heads (not shown in FIG. 3) can use learned track queries 346 to output any additional (e.g., application-specific) information.

Output tracks 360, which represent some or all data generated and output by classification heads 350-356 (or any additional heads), can be processed by a track continuity module 370. For example, track continuity module 370 can receive a set of tracks identified in frames obtained at times $t_1 \ldots t_N$ and another set of tracks identified in frames obtained at times $t_{N+1} \ldots t_{2N}$. Using the linked bounding box information, object type information, motion (velocity/acceleration) information, output by heads 350-356, track continuity module 370 can match the ends of the earlier $t_1 \ldots t_N$ tracks to the beginnings of the subsequent tracks $t_{N+1} \ldots t_{2N}$ and so ensure the continuity of tracking. Track continuity module 370 can perform such track matching for each new set of identified tracks over arbitrarily long times. Track continuity module 370 can maintain a repository of currently open tracks. A track that disappears during one of the set of N frames can be assigned an inactive status. An inactive track can be an object that disappeared from the sensing field of view or an object that is temporarily occluded. If an object associated with an inactive track does not reappear within a certain period of time (e.g., during a predetermined number of sensing frames), such a track can be deleted.

Figure 5:
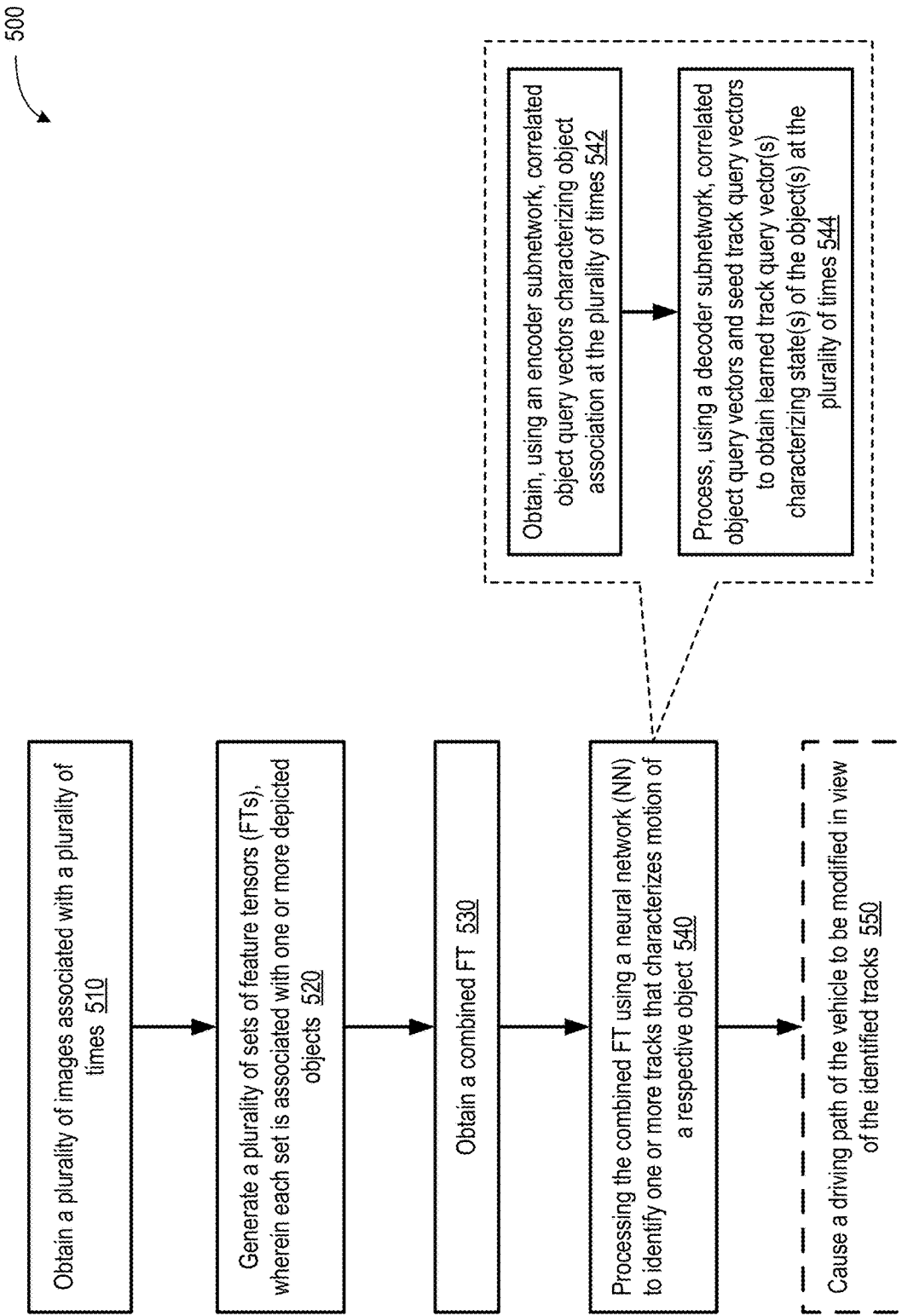
FIG. 5 illustrates an example method of an inference stage of end-to-end identification and tracking of objects, in accordance with some implementations of the present disclosure.
Figure 6:
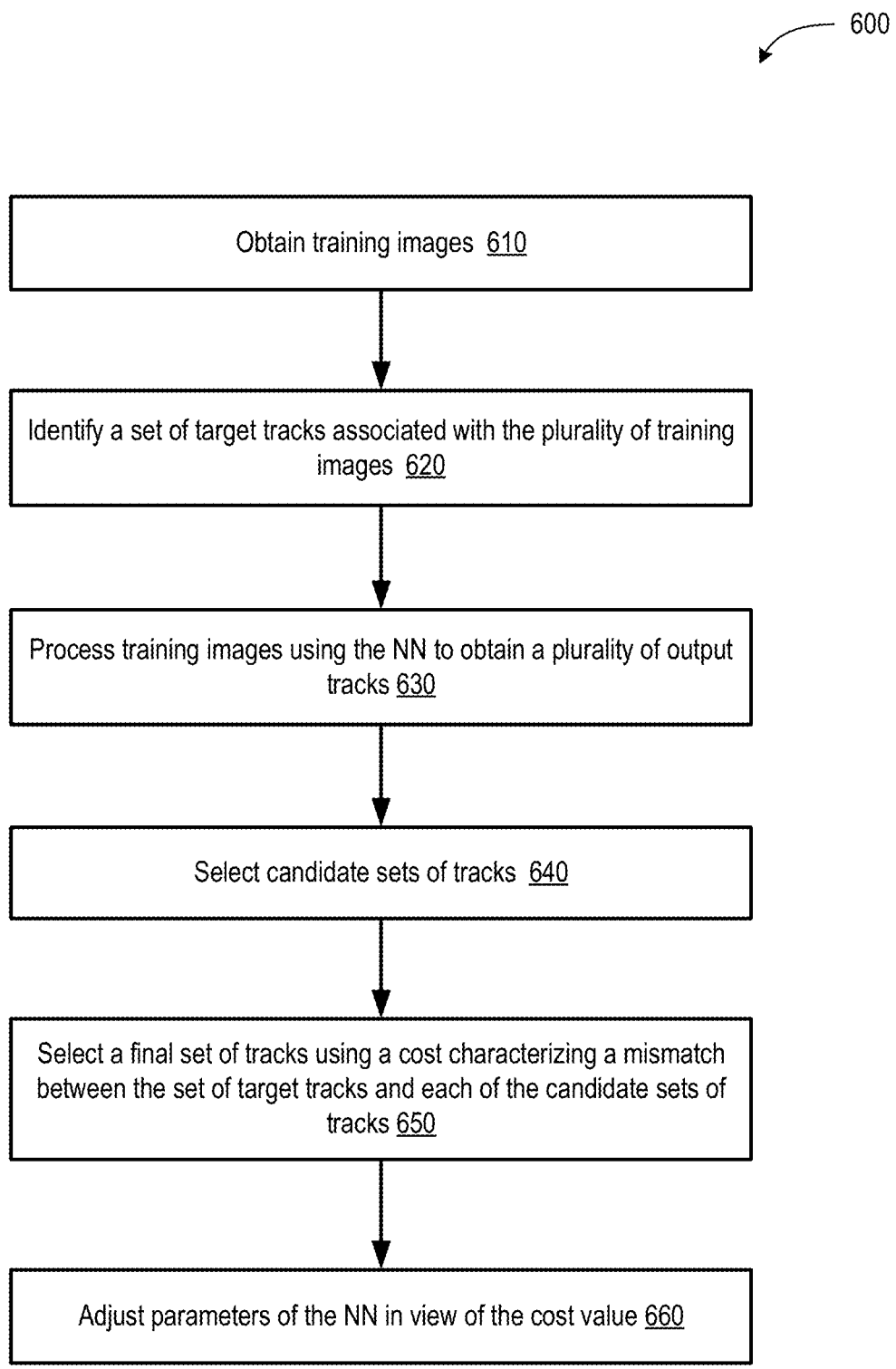
FIG. 6 illustrates an example method of a training stage of end-to-end identification and tracking of objects, in accordance with some implementations of the present disclosure.

FIGS. 5-6 illustrate example methods 500-600 of using and training machine-learning models for end-to-end identification and tracking of objects. A processing device, having one or more processing units (CPUs) and memory devices communicatively coupled to the CPU(s), can perform methods 500-600 and/or each of their individual functions, routines, subroutines, or operations. The processing device executing methods 500-600 can perform instructions issued by various components of the sensing system 110 or data processing system 120 of FIG. 1, e.g., EET 132, SPM 134 (SPM 220, SPM 320), etc. In some implementations, methods 500-600 can be directed to systems and components of an autonomous driving vehicle, such as the autonomous vehicle 100 of FIG. 1. Methods 500-600 can be used to improve performance of the processing system 120 and/or the autonomous vehicle control system 140. In certain implementations, a single processing thread can perform methods 500-600. Alternatively, two or more processing threads can perform methods 500-600, each thread executing one or more individual functions, routines, subroutines, or operations of the methods. In an illustrative example, the processing threads implementing methods 500-600 can be synchronized (e.g., using semaphores, critical sections, and/or other thread synchronization mechanisms). Alternatively, the processing threads implementing methods 500-600 can be executed asynchronously with respect to each other. Various operations of methods 500-600 can be performed in a different order compared with the order shown in FIGS. 5-6. Some operations of methods 500-600 can be performed concurrently with other operations. Some operations can be optional.

FIG. 5 illustrates an example method 500 of an inference stage of end-to-end identification and tracking of objects, in accordance with some implementations of the present disclosure. Method 500 can use real-time sensing data obtained by scanning an environment of a vehicle (or any other relevant environment) using a plurality of sensors of the sensing system of the vehicle. The sensing system can include one or more lidar sensors, radar sensors, optical range cameras, IR cameras, and/or other sensors. Optical range and/or IR cameras can include panoramic (surround-view) cameras, partially panoramic cameras, high-definition (high-resolution) cameras, close-view cameras, cameras having a fixed field of view (relative to the AV), cameras having a dynamic (adjustable) field of view, cameras having a fixed or adjustable focal distance, cameras having a fixed or adjustable numerical aperture, and any other suitable cameras. Optical range cameras can further include night-vision cameras. Sensing data should be understood as any data obtained by any sensors of the sensing system, including raw (unprocessed) data, low-level (minimally processed) data, high-level (fully processed) data, and so on. Sensing data can include images, which should be understood as any arrays or tables of digital data (e.g., of data pixels) that represents the sensing data and maps detected intensity (or any function of the detected intensity, e.g., inferred temperature of detected objects) to various spatial locations in the environment. Images can include various metadata that provides geometric associations between image pixels and spatial locations of objects, correspondence of pixels of one image (e.g., a lidar image) and pixels of another image (e.g., a camera image), and so on. The detected intensities can refer to the magnitude of electromagnetic signals detected by various sensors as well as Doppler shift (radial velocity)

data, as can be obtained by lidar and/or radar sensors. Method 500 can use a detection MLM (e.g., detection model 310) and a prediction MLM (e.g., SPM 320), which may be parts of a perception system (or any other suitable data processing system) of an autonomous vehicle or any vehicle that deploys a driver assistance technology.

At block 510, method 500 can include obtaining, by one or more sensors, a plurality of images of an environment. Each image of the plurality of images can be associated with a corresponding time $t_1$ of a plurality of times $t_1, t_2 \ldots t_N$. The plurality of images of the environment can include one or more camera images (optical and/or IR), one or more lidar images, one or more radar images, one or more sonar images, and the like. At block 520, method 500 can continue with one or more processing devices generating a plurality of sets of feature tensors (FTs). Each set can be associated with one or more objects of the environment depicted in a respective image of the plurality of images. For example, as illustrated in FIG. 4, a first set of feature tensors 413-1, 415-1, 417-1, 419-1 can be associated with respective objects 403-1, 405-1, 407-1, 409-1 depicted in frame 1 402-1, a second set of feature tensors 413-2, 415-2, 417-2, 419-2 can be associated with respective objects 403-2, 405-2, 407-2, 409-2 depicted in frame 2 402-2, and so on. In some implementations, generating the plurality of sets of FTs can include processing, using a detector NN, graphical representations of the plurality of images, e.g., pixelated representations (such as heat maps), which can further include multiple pixel intensities. Pixel intensities should be understood as any data associated with a particular pixel, e.g., black-and-white intensities, color intensities, pseudo-intensities indicating Doppler lidar/radar shifts, reflectivity values, temperature values, and the like. In some implementations, the detector NN can also output semantic information for at least some of the one or more objects of the environment. The semantic information can include a type (class) of the object, e.g., a passenger car, a bus, a semi-truck, a pickup truck, a motorcycle, a bicycle, a pedestrian, an animal, etc. In some implementations, the semantic information output by the detector NN can be preliminary (rather than determinative) and can include multiple types (classes) together with the respective probabilities, e.g., a bicycle with 60% probability, a motorcycle with 25% probability, a pedestrian with 10% probability, and so on.

At block 530, method 500 can continue with obtaining, using the plurality of sets of FTs, a combined FT. For example, the first set of FTs 413-1 . . . 419-1, the second set of FTs 413-2 . . . 419-2, and so on, can be joined into combined FT 312. In some implementations, obtaining the combined FT can involve concatenating the FTs of the plurality of sets of FTs.

At block 540, the one or more processing devices can process the combined FT using a neural network (e.g., SPM 320 of FIG. 3) to identify one or more tracks (e.g., tracks 360). Each track can characterize a motion of a respective object of the one or more objects of the environment. For example, a first track can link pedestrian 403-1 in first frame 402-1 to pedestrian 403-2 in second frame 402-2 and further to pedestrian 403-3 in third frame 402-3, and so on.

In some implementations, as depicted with the callout portion in FIG. 5, processing of the combined FT using the neural network can include, at block 542, obtaining, using an encoder subnetwork (e.g., encoder subnetwork 330) one or more correlated object query vectors (e.g., learned object queries 336). In some implementations, the encoder subnetwork can include one or more attention layers of neurons (e.g., transformer layers 332, which can include self-attention layers). A first (second, etc.) correlated object query vector of the one or more correlated object query vectors can characterize association of a first (second, etc.) object of the one or more objects at a first time with the first (second, etc.) object at a second time, and so on.

As indicated with block 544, processing the combined FT can further include processing, using a decoder subnetwork (e.g., decoder subnetwork 340), the one or more correlated object query vectors (e.g., learned object queries 336) and a plurality of seed track query vectors (e.g., seed track queries 343) to obtain one or more learned track query vectors (e.g., learned track queries 338). For example, a first (second, etc.) learned track query vector can characterize states of the first (second, etc.) object at the plurality of times. The states of the first (second, etc.) object can include information (which can be in a computer-readable embedding format) a location/type/size/pose/motion/etc. of the first (second, etc.) object.

In some implementations, the neural network can further include one or more classification heads (e.g., heads 350-356) that are configured to output, for a first (second, third, etc.) object of the one or more objects of the environment, at least one of a type of the first (second, third, etc.) object, a size of the first (second, third, etc.) object, a pose of the first (second, third, etc.) object, a velocity of the first (second, third, etc.) object, or an acceleration of the first (second, third, etc.) object.

At block 550, method 500 can continue with causing a driving path of the vehicle to be modified in view of the identified tracks. The modification of the driving path of the vehicle can depend on the characteristics and motion of the objects associated with the tracks, e.g., the type, the size, the pose, the velocity/acceleration of the objects, etc. In some implementations, the determination of the pose and motion of the objects can be improved (e.g., to reduce the uncertainties caused by a measurement noise) using a Kalman (or similar) filtering. The perception system can communicate the information about the tracked objects to the control system (e.g., the AVCS 140). The control system can chart a new driving path (or modify the existing driving path) that avoids the object. The control system can implement the new driving path by outputting instructions to powertrain and steering 150, vehicle electronics 160, signaling 170, etc., to cause the vehicle to brake, change lanes, stop, back up, accelerate, and so on, and to ensure that the vehicle follows the determined driving path. In some implementations, the control system can alert the driver of a driver-operated vehicle as to the presence of various objects near an existing driving path of the vehicle. The driver can then modify the driving path of the vehicle.

FIG. 6 illustrates an example method 600 of a training stage of end-to-end identification and tracking of objects, in accordance with some implementations of the present disclosure. Method 600 can be used to train SPM 220 (or SPM 320) or SPM 220 together with detection model 210. Method 600 can use previously recorded sensing data obtained by scanning an environment of a vehicle (or any other relevant environment) using a plurality of sensors of the sensing system of the vehicle. The sensing system can include any one of the sensors (capable of obtaining any type of data) referenced above in conjunction with method 500.

At block 610, method 600 can include obtaining a plurality of training images, e.g., a number of lidar/radar/camera/IR camera/sonar/etc. images. At block 620, method 600 can continue with obtaining an identification (ground truth) of a set of target tracks (e.g., m target tracks) associated with the plurality of training images. At block 630, a processing device performing the training can process the plurality of training images using the neural network being trained to obtain a plurality of output tracks (e.g., M output tracks). The number of output tracks can be larger than the number of target tracks (e.g., M>m). At block 640, method 600 can continue with selecting a plurality of candidate sets of tracks. For example, each of the plurality of candidate sets of tracks can include m of the M output tracks (e.g. up to M!/[m!(M−n)!] number of candidate sets). At block 650, method 600 can include selecting a final set of tracks, from the plurality of candidate sets of tracks, using a cost value that characterizes a mismatch between the set of target tracks and each of the plurality of candidate sets of tracks. For example, the processing device performing training can use the Hungarian algorithm (or any similar algorithm) to select the final candidate set of tracks as the set that has the lowest cost value among the candidate sets of tracks. The cost values can be computed using any suitable cost (loss) function, e.g., mean square loss function, cross-entropy loss function, and so on. At block 660, the processing device can adjust parameters (e.g., weights, biases, etc.) of the neural network in view of the cost value, e.g., using various techniques of backpropagation that cause the cost value of the final candidate set of tracks to decrease. After training, the trained neural network can be used as described above in conjunction with method 500.

Figure 7:
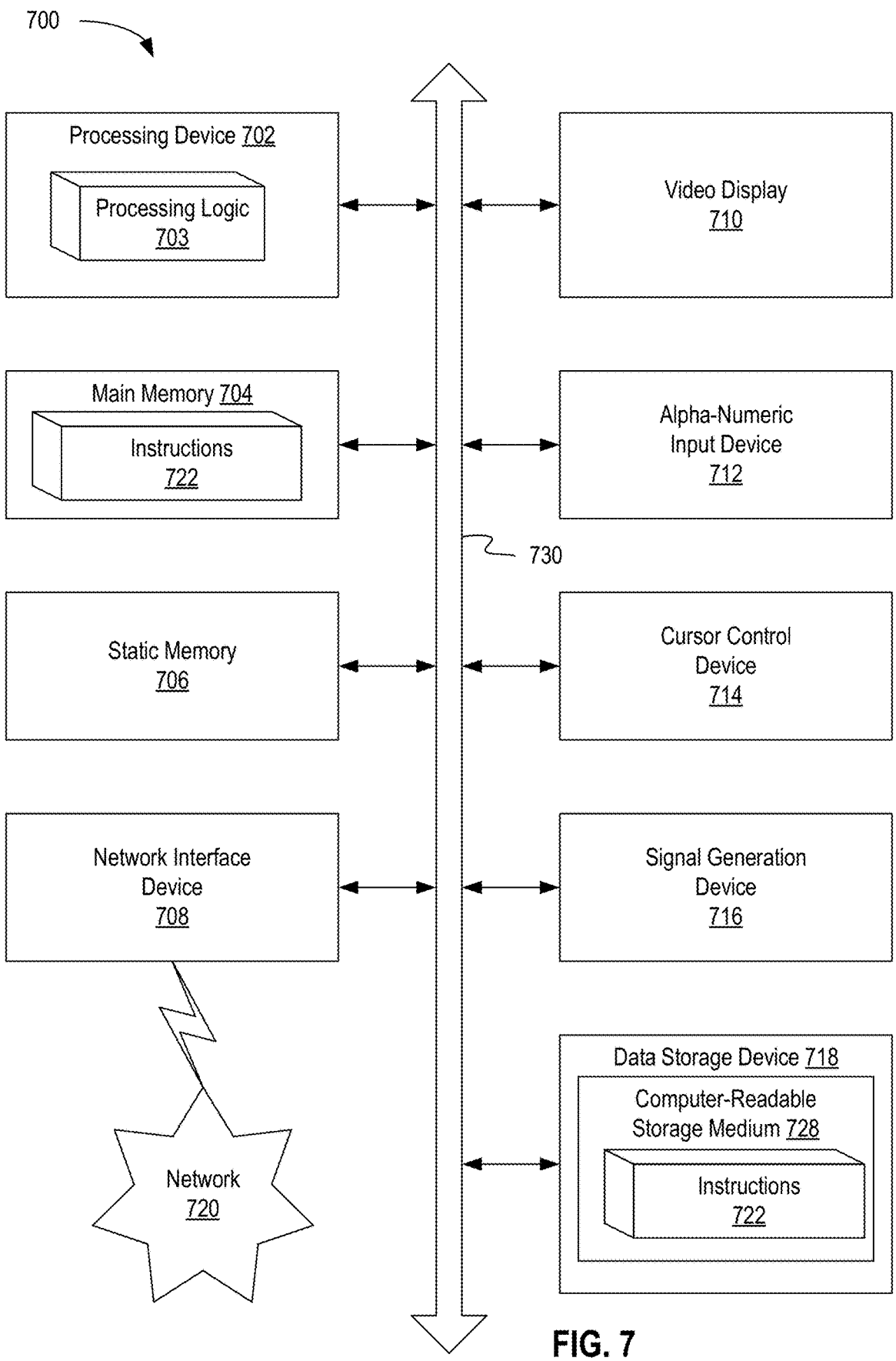
FIG. 7 depicts a block diagram of an example computer device capable of enabling fast and accurate end-to-end identification and tracking of objects, in accordance with some implementations of the present disclosure.

FIG. 7 depicts a block diagram of an example computer device 700 capable of enabling fast and accurate end-to-end identification and tracking of objects, in accordance with some implementations of the present disclosure. Example computer device 700 can be connected to other computer devices in a LAN, an intranet, an extranet, and/or the Internet. Computer device 700 can operate in the capacity of a server in a client-server network environment. Computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 500 of an inference stage of end-to-end identification and tracking of objects and method 600 of a training stage of end-to-end identification and tracking of objects.

Example computer device 700 can further comprise a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 500 of an inference stage of end-to-end identification and tracking of objects and method 600 of a training stage of end-to-end identification and tracking of objects.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    obtaining, by one or more sensors, a plurality of images of an environment, wherein each image of the plurality of images is associated with a corresponding time of a plurality of times;
    generating, by one or more processing devices, a plurality of sets of feature tensors (FTs), wherein each set of FTs is associated with one or more objects of the environment depicted in a respective image of the plurality of images;
    obtaining, using the plurality of sets of FTs, a combined FT;
    processing the combined FT using an encoder neural network (NN) to generate a plurality of object vectors, each object vector of the plurality of object vectors characterizing association of an individual FT of the plurality of sets of FTs with other FTs of the plurality of sets of FTs; and
    processing, using a decoder NN, the plurality of object vectors to identify one or more tracks, wherein each track of the one or more tracks characterizes motion of a respective object of the one or more objects of the environment.

2. The method of claim 1, wherein the plurality of images of the environment comprises one or more camera images, one or more lidar images, or one or more radar images.

3. The method of claim 1, wherein obtaining the combined FT comprises concatenating the FTs of the plurality of sets of FTs.

4. The method of claim 1, wherein generating the plurality of sets of FTs comprises processing, using a detector NN, graphical representations of the plurality of images.

5. The method of claim 4, wherein the detector NN is further configured to output semantic information for at least some of the one or more objects of the environment.

6. The method of claim 1,
    wherein the encoder NN comprises one or more attention layers of neurons, and wherein a first object vector of the plurality of object vectors characterizes at least an association of a first object of the one or more objects at a first time of the plurality of times with the first object at a second time of the plurality of times.

7. The method of claim 6, wherein a second object vector characterizes at least an association of the first object at the first time with a second object of the one or more objects at the second time.

8. The method of claim 6, wherein processing the plurality of object vectors comprises:
    processing, using the decoder NN, the one or more plurality of object vectors and a plurality of seed track vectors to obtain one or more learned track vectors, wherein a first learned track vector characterizes states of the first object at the plurality of times.

9. The method of claim 1, further comprising processing, using one or more classification heads, an output of the decoder NN to generate, for a first object of the one or more objects of the environment, at least one of a type of the first object, a size of the first object, a pose of the first object, a velocity of the first object, or an acceleration of the first object.

10. The method of claim 1, wherein the encoder NN and the decoder NN are trained using operations comprising:
    obtaining a plurality of training images;
    obtaining an identification of a set of target tracks associated with the plurality of training images;
    processing the plurality of training images using the encoder NN and the decoder NN to obtain a plurality of output tracks;
    selecting a plurality of candidate sets of tracks from the plurality of output tracks;
    selecting a final set of tracks, from the plurality of candidate sets of tracks, using a cost value that characterizes a mismatch between the set of target tracks and each of the plurality of candidate sets of tracks; and
    adjusting parameters of at least one of the encoder NN or the decoder NN in view of the cost value.

11. A system comprising:
    a sensing system configured to:
        obtain a plurality of images of an environment, wherein each image of the plurality of images is associated with a corresponding time of a plurality of times; and a processing device operatively coupled to the sensing system and configured to:
generate a plurality of sets of feature tensors (FTs), wherein each set of FTs is associated with one or more objects of the environment depicted in a respective image of the plurality of images;
obtain, using the plurality of sets of FTs, a combined FT;
process the combined FT using an encoder neural network (NN) to generate a plurality of object vectors, each object vector of the plurality of object vectors characterizing association of an individual FT of the plurality of sets of FTs with other FTs of the plurality of sets of FTs; and
process, using a decoder NN, the plurality of object vectors to identify one or more tracks, wherein each track of the one or more tracks characterizes motion of a respective object of the one or more objects of the environment.

12. The system of claim 11, wherein the plurality of images of the environment comprises one or more camera images, one or more lidar images, or one or more radar images.

13. The system of claim 11, wherein to obtain the combined FT, the processing device is to concatenate the FTs of the plurality of sets of FTs.

14. The system of claim 11, wherein each set of the plurality of sets of FTs is generated by a detector NN configured to process graphical representations of the plurality of images.

15. The system of claim 14, wherein the detector NN is further configured to output semantic information for at least some of the one or more objects of the environment.

16. The system of claim 11, wherein at least one of the encoder NN or the decoder NN comprises one or more transformer blocks, and wherein a first object vector of the plurality of object vectors characterizes at least an association of a first object of the one or more objects at a first time of the plurality of times with the first object at a second time of the plurality of times.

17. The system of claim 16, wherein a second object vector characterizes at least an association of the first object at the first time with a second object of the one or more objects at the second time.

18. The system of claim 16, wherein to process the plurality of object vectors, the processing device is to:
process, using the decoder NN, the plurality of object vectors and a plurality of seed track vectors to obtain one or more learned track vectors, wherein a first learned track vector characterizes locations of the first object at the plurality of times.

19. The system of claim 11, wherein the processing device is further to:
process, using one or more classification heads, an output of the decoder NN to generate, for a first object of the one or more objects of the environment, at least one of a type of the first object, a size of the first object, a pose of the first object, a velocity of the first object, or an acceleration of the first object.

20. A system comprising:
a sensing system of an autonomous vehicle (AV), the sensing system configured to:
obtain a plurality of images of an environment, wherein each image of the plurality of images is associated with a corresponding time of a plurality of times; and
a processing device configured to:
process, using a detector machine-learning model (MLM), graphical representations of the plurality of images; and
generate, using a prediction MLM, a plurality of sets of feature tensors (FTs), wherein each set of FTs is associated with one or more objects of the environment depicted in a respective image of the plurality of images;
obtain, using the plurality of sets of FTs, a combined FT;
process the combined FT using an encoder neural network (NN) to generate a plurality of object vectors, each object vector of the plurality of object vectors characterizing association of an individual FT of the plurality of sets of FTs with other FTs of the plurality of sets of FTs;
process, using a decoder NN, the plurality of object vectors to identify one or more tracks, wherein each track of the one or more tracks characterizes motion of a respective object of the one or more objects of the environment; and
cause a driving path of the AV to be modified in view of the identified one or more tracks.

* * * * *